United States Patent
Thompson et al.

(10) Patent No.: US 11,956,274 B1
(45) Date of Patent: Apr. 9, 2024

(54) SYSTEM AND METHOD FOR IMPLEMENTING A SECURE CONFIGURATION OF CONTROLLERS AND INSTRUMENTS IN A NETWORKED SYSTEM

(71) Applicant: Keysight Technologies, Inc., Santa Rosa, CA (US)

(72) Inventors: Keith Charles Thompson, Fort Collins, CO (US); Joseph Eugene Mueller, Loveland, CO (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 291 days.

(21) Appl. No.: 17/189,634

(22) Filed: Mar. 2, 2021

(51) Int. Cl.
*H04L 9/40* (2022.01)

(52) U.S. Cl.
CPC ........ *H04L 63/166* (2013.01); *H04L 63/0823* (2013.01)

(58) Field of Classification Search
CPC ................... H04L 63/0823; H04L 63/166
See application file for complete search history.

(56) References Cited

U.S. PATENT DOCUMENTS

| | | | |
|---|---|---|---|
| 7,392,387 B2 | 6/2008 | Balfanz et al. | |
| 8,250,636 B2 | 8/2012 | Hirsch | |
| 8,850,543 B2 | 9/2014 | Von Bokern et al. | |
| 9,172,544 B2 | 10/2015 | Pettigrew et al. | |
| 9,781,098 B2 * | 10/2017 | Mohamad Abdul | G06F 8/60 |
| 9,980,140 B1 * | 5/2018 | Spencer | H04W 12/02 |
| 2006/0200866 A1 * | 9/2006 | Cameron | H04L 63/126 |
| | | | 726/27 |
| 2018/0302228 A1 * | 10/2018 | Hergesheimer | H04L 9/321 |
| 2018/0335928 A1 * | 11/2018 | Van Os | G06F 3/04817 |
| 2019/0007216 A1 * | 1/2019 | Meriac | G06F 21/572 |
| 2022/0050675 A1 * | 2/2022 | Tamir | G06F 21/577 |
| 2022/0100854 A1 * | 3/2022 | Ahmed | H04L 63/1433 |
| 2022/0131695 A1 * | 4/2022 | Pike | H04L 9/14 |

* cited by examiner

*Primary Examiner* — Bassam A Noaman (57) ABSTRACT

A system and method are provided for implementing a secure configuration of a networked system for secure communications, the networked system including at least one instrument for performing corresponding tasks and at least one controller for controlling functions of the at least one instrument. The method includes providing a secure instrument configuration (SIC); displaying status provided by the SIC server identifying the controller and the instruments to a user via a user interface; writing controller secure configuration information from the SIC server to the controller through a software agent on the controller, the controller secure configuration information including authentication data for the instruments, and/or credentials of the one controller acceptable by the one instruments for identifying the controller; and communicating with the controller to initiate implementation of the secure configuration. The controller establishes a secure connection with the instruments using the controller secure configuration information.

19 Claims, 2 Drawing Sheets

SYSTEM AND METHOD FOR IMPLEMENTING A SECURE CONFIGURATION OF CONTROLLERS AND INSTRUMENTS IN A NETWORKED SYSTEM

BACKGROUND

In conventional networked systems, such as test and measurement systems, the networked devices (e.g., controllers and instruments) may communicate through secure connections to provide confidentiality. To establish the secure connections, it is necessary for each networked device to have credentials that robustly identify itself and to support encrypted communication, and authentication information to validate credentials proffered by other network devices. For example, in a test and measurement system, each controller and instrument has credentials used to identify themselves, and credential validation information that is used to authenticate the credentials presented by other controllers and/or instruments. So, each instrument needs to know how to authenticate each controller, as well as identify itself, and each controller needs to know how to validate each instrument, as well as identify itself.

The secure connections are typically established by stand-alone configuration interfaces on each of the networked devices. In order to provide a secure configuration, the stand-alone configuration interfaces require the user to physically go to each instrument, for example, access each instrument using a user name and password, and separately configure credentials of each instrument and how that instrument will validate other networked devices attempting to access it during operation. In addition, the user must go to each controller (e.g., test station in a test and measurement system), access each controller using a user name and password, and separately configure credentials of the controller that are proffered when connecting to each instrument (based on the users configured into the instruments) and how the controller will validate the instrument credentials. This process is difficult, error-prone and time consuming with regard to users setting up and maintaining all of the configuration information for the secure configuration distributed among multiple networked devices. These issues are replicated when the user makes changes to the networked system, such as adding new controllers that all instruments need to know about.

In addition, for complex credential mechanisms involving credential generation and validation through a third party, each instrument has to implement independently the communication with the third party service, which is burdensome on the instrument. It is further complicated because the third party services are likely to evolve over the lifetime of the instrument, requiring updates to be performed if the practical lifetime of the instrument is to be extended with such updates.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Generally, a networked system, such as a test and measurement system, includes one or more instruments for performing corresponding functions (test and measurement operations), such as stimulus, response and routing testing of a device under test (DUT), for example, and one or more controllers for executing instructions that direct the instruments to perform the necessary functions. The networked system also includes a secure instrument configuration (SIC) server for automatically configuring the networked devices, enabling secure communications to be established remotely among the networked devices according to secure protocols from a central control point. That is, all the networked devices are accessed and configured for secure communications from the SIC sever, so that the configuration process is centralized, the only parties privy to the communications are ones intended by the user, and the networked system cannot otherwise be accessed by unauthorized parties. This simplifies the configuration process, reduces user error in attempting to access and configure the separate networked devices, and saves significant amounts of time.

The representative embodiments described herein provide a centralized configuration application implemented by an SIC server for establishing secure configurations of networked systems, which may be using conventional network security. The embodiments do not bear on the secure protocols themselves, but rather provide efficient techniques for enabling secure access to networked devices from the SIC server, and for configuring secure connections among the networked devices according to these secure protocols. In addition, the configuration techniques may provide services from a third party to the networked devices after the secure configuration is complete. That is, the SIC server may offer third party services to the networked devices, which are able to perform authentication using a simple interface to the SIC server, by interrogating the SIC server at run-time. The SIC server checks site credentials, using services such as those provided by a RADIUS™ (RFC 2865) server, for example, for the services and informs the networked devices whether the services should be accepted.

According to a representative embodiment, a computer implemented method is provided for implementing a secure configuration of a networked system for secure communications, where the networked system includes at least one instrument for performing corresponding tasks, and at least one controller for controlling functions of the at least one instrument. The method includes providing an SIC server on a computer, the at least one controller or the at least one instrument; receiving identification of the at least one controller and the at least one instrument via a user interface; writing controller secure configuration information from the SIC server to the at least one controller through a software agent on the at least one controller, the controller secure configuration information including authentication data for the at least one instrument, and/or one or more credentials of the at least one controller acceptable by the at least one instrument for identifying the at least one controller; and communicating with the at least one controller to initiate implementation of the secure configuration, where the at least one controller establishes a secure connection with the at least one instrument using the controller secure configuration information. The method further includes writing instrument secure configuration information from the SIC server to the at least one instrument through a software agent on the at least one instrument, the instrument secure configuration information including authentication data and authentication methods to be supported by the at least one instrument for the at least one instrument to authenticate the at least one controller, where the at least one controller establishes the secure connection with the at least one instrument further using the instrument secure configuration information.

Figure 1:
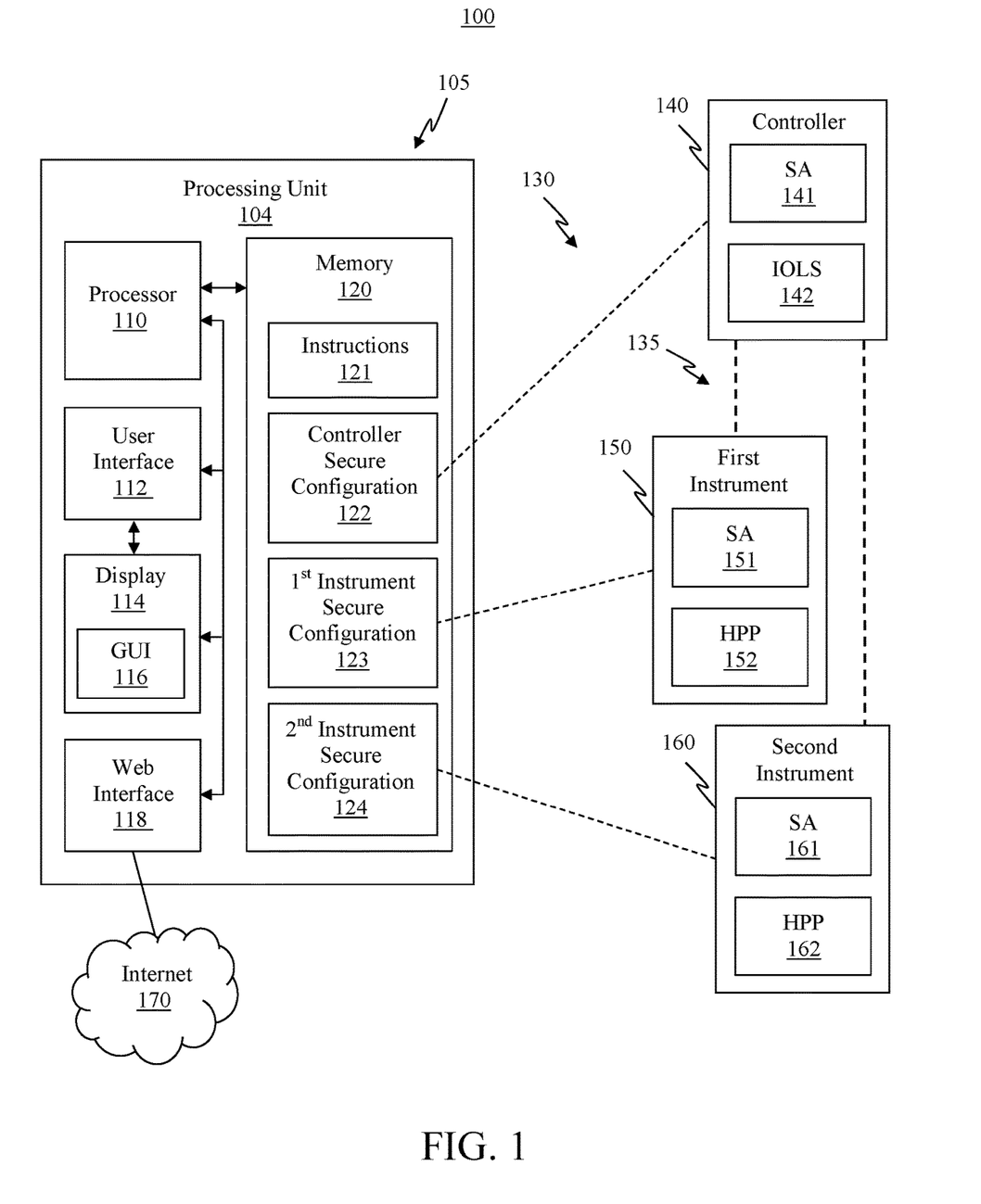
FIG. 1 is a simplified block diagram showing a networked system for implementing a secure configuration of at least one controller and at least one instrument, according to a representative embodiment.

FIG. 1 is a simplified block diagram showing a networked system for implementing a secure configuration of at least one controller and at least one instrument, according to a representative embodiment. As will be appreciated by one of ordinary skill in the art having the benefit of the present disclosure, one embodiment of the system is a test and measurement system used for testing various electronic devices under test (DUTs) and/or measuring parameters of the DUTs in controlled environments. However, it is emphasized that the presently described system is not limited to test and measurement systems, and can be applied to other types of networks requiring network security among the networked devices.

Referring to FIG. 1, networked system 100 includes a processing unit 104 for implementing a secure instrument configuration (SIC) server 105, a communication network 130, a representative controller 140, a representative first instrument 150, a representative second instrument 160, and a control network 135. The controller 140 and the first and second instruments 150 and 160 may be collectively referred to as networked devices. For purposes of illustration, the processing unit 104 is shown as a stand-alone computer, such as a PC or laptop, separate from the controller 140 and the first and second instruments 150 and 160, which stores and executes SIC server software of the SIC server 105. However, it is understood that the SIC server 105 may be incorporated into or installed on any centralized processing device capable of storing and executing the SIC server software, such as the controller 140, the first instrument 150 or the second instrument 160, without departing from the scope of the present teachings.

As mentioned above, the networked system 100 may be a test and measurement system, in which case the controller 140 may be a test station and each of the first and second instruments 150 and 160 may be test instruments, such as a signal generator, a digital multi-meter, a digital oscilloscope, or a vector network analyzer, for example, used for testing a DUT (not shown) under control of the test station. The first and second instruments 150 and 160 may also function as controllers. For purposes of explanation, it is assumed that the controller 140 and the first and second instruments 150 and 160 are networked devices in an illustrative test scenario. However, it is understood that more or fewer controller(s) and/or instrument(s) may be included in other test scenarios securely established and controlled according to embodiments described herein, without departing from the scope of the present teachings.

The communication network 130 may be any type of compatible wireless and/or wired network, such as an ethernet network, a wireless local area network (LAN), a wired LAN, for example, that enables communications between the SIC server 105 and each of the controller 140, the first instrument 150 and the second instrument 160. The control network 135 provides secure connections between the controller 140 and each of the first and second instruments 150 and 160, enabling the controller 140 to configure and control the first and second instruments 150 and 160 to perform the testing or other functionality. When the networked system 100 is a test and measurement system, the control network 135 may utilize an Interchangeable Virtual Instrument Foundation, High-Speed LAN instrument protocol (IVI Hi SLIP), rev 2, or a transport layer security (TLS) protocol, to transport standard commands for programmable instruments (SCPI) commands, for example. However, any type of wireless or wired network capable of providing secure connections and delivering messages between the networked devices through the wireless or wired network may be incorporated without departing from the scope of the present teachings. When the SIC server 105 is incorporated into the controller 140, the first instrument 150 or the second instrument 160, as mentioned above, the control network 135 may also serve as the communications network. The structural configuration of each of the controller 140, the first instrument 150 and the second instrument 160 may include, but is not limited to, processor(s), computer-usable/computer readable storage medium(s), an operating system, application module(s), and/or peripheral device controller (s).

The processing unit 104 includes a processor 110 and a memory 120. The processor 110 is representative of one or more processing devices, and may be implemented by field programmable gate arrays (FPGAs), application specific integrated circuits (ASICs), a digital signal processor (DSP), a computer processor, a central processing unit (CPU), a microprocessor, a microcontroller, a state machine, programmable logic device, or combinations thereof, using any combination of hardware, software, firmware, hard-wired logic circuits, or combinations thereof. Any processing unit or processor herein may include multiple processors, parallel processors, or both. Multiple processors may be included in, or coupled to, a single device or multiple devices. The term "processor" as used herein encompasses an electronic component able to execute a program or machine executable instruction. A processor may also refer to a collection of processors within a single computer system or distributed among multiple computer systems, such as in a cloud-based or other multi-site application. Programs have software instructions performed by one or multiple processors that may be within the same computing device or which may be distributed across multiple computing devices.

The memory 120 stores instructions executable by the processor 110 and secure configuration information for configuring the controller 140 and the first and second instruments 150 and 160 for establishing secure connections. The memory 120 may include main memory and/or static memory, where such memories may communicate with each other and the processor 110 via one or more buses. The memory 120 may be implemented by any number, type and combination of random access memory (RAM) and read-only memory (ROM), for example, and may store various types of information, such as software algorithms, artificial intelligence (AI) models, and computer programs, which are executable by the processor 110. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, Blu-ray disk, a universal serial bus (USB) drive, or any other form of storage medium known in the art. The memory 120 is a tangible storage medium for storing information, data and executable software instructions, and is non-transitory during the time software instructions are stored therein. As used herein, the term "non-transitory" is to be interpreted not as an eternal characteristic of a state, but as a characteristic of a state that will last for a period. Also, the term "non-transitory" specifically disavows fleeting characteristics such as characteristics of a carrier wave or signal or other forms that exist only transitorily in any place at any time. The memory 120 may be secure and/or encrypted, or unsecure and/or unencrypted.

In the depicted embodiment, the memory 120 is shown to include software modules, each of which includes corresponding instructions, data and/or other information for providing secure configurations. An instructions module 121 includes instructions that, when executed by the processor 110, perform one or more processes for implementing a secure configuration of controller(s) and instrument(s) in a networked system from a centralized location, e.g., described below with reference to FIG. 2, for example. A controller secure configuration module 122 includes secure configuration information regarding secure connections specific to the controller 140 and for providing secure communications between the controller 140 and each of the first and second instruments 150 and 160 over the control network 135. A first instrument secure configuration module 123 includes secure configuration information regarding secure connections specific to the first instrument 150 for providing the secure communications between the controller 140 and the first instrument 150. A second instrument secure configuration module 124 includes secure configuration information regarding secure connections specific to the second instrument 160 for providing the secure communications between the controller 140 and the second instrument 160. For purposes of illustration, FIG. 1 shows one controller (controller 140) and two instruments (first and second instruments 150 and 160), with corresponding secure configuration modules in the memory 120. It is understood, however, that variations of the networked system 100 may include more than one controller and/or fewer or more than two instruments, and corresponding secure configuration modules, without departing from scope of the present teachings.

The processing unit 104 and/or the SIC server 105 further includes a user interface 112, a display 114, and a graphical user interface (GUI) 116. The user interface 112 is configured to receive information input by the user to be used by the processor 110, and to provide information output by the processor 110 and/or the memory 120 to the user. That is, the user interface 112 enables the user to enter data and instructions to control or manipulate aspects of the processes described herein, and also enables the processor 110 to indicate the effects of the user's control or manipulation. All or a portion of the user interface 112 may be implemented by the GUI 116 viewable on the display 114, discussed below. Alternatively, all or a portion of the user interface 112 may be implemented by a user programmatic interface (UPI) (not shown). The user interface 112 may include one or more of a mouse, a keyboard, a trackball, a joystick, a microphone, a video camera, a touchpad, a touchscreen, voice or gesture recognition captured by a microphone or video camera, for example. The display 114 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 114 includes a screen for viewing information regarding the secure configurations of the controller 140, and the first and second instruments 150 and 160, along with various features described herein to assist the user in efficiently configuring the same for secure communications. The GUI 116 enables the user to interact with the displayed images and features on the display 114.

The user interface 112 enables the user to input (1) set-up information identifying networked devices for different test scenarios, and (2) secure configuration information for establishing secure communications among the identified networked devices. For example, in the depicted embodiment, set-up information would include network address and security information necessary to establish communication with the controller 140, the first instrument 150 and the second instrument 160 over the network 130 for the test scenario. The secure configuration information (e.g., usernames and/or passwords) is to be used over network 135 for establishing secure connections between each of the controller 140 and the first and second instruments 150 and 160 in the test scenario. The secure configuration information for the controller 140 would include the controller credentials and instrument authentication configuration information for the controller 140, and the security configuration information for the instruments would include each respective instruments' credentials and also the controller authentication information.

Using the set-up information, the SIC server 105 identifies and establishes secure connections over the communication network 130 with each of the controller 140 and the first and second instruments 150 and 160. The SIC server 105 can then write the secure configuration information to the appropriate ones of the controller 140, the first instrument 150 and the second instrument 160 to enable the controller 140 to establish secure connections with the first and second instruments 150 and 160 over the control network 135. To accomplish this, the controller secure configuration information sent to the controller 140 includes at least authentication data (e.g., root authority certificates) and authentication methods to be used by the controller 140 to authenticate the identity of the first and second instruments 150 and 160 in the test scenario, and controller credentials (e.g., certificates) to be used by the first and second instruments 150 and 160 to authenticate the controller 140. Similarly, the instrument secure configuration information sent to the first and second instruments 150 and 160 includes at least credentials to be proffered by the instruments and authentication methods to be used by the first and second instruments 150 and 160 to authenticate the credentials of the controller 140. The set-up information and the configuration information are discussed further with reference to FIG. 2.

The processing unit 104 and/or the SIC server 105 also includes (optionally) a web interface 118. The web interface 118 enables control of the SIC server 105 from an independent computer over the internet. In an embodiment, the web interface 118 may also enable control of the SIC server 105 from the controller 140 and/or either or both of the first and second instruments 150 and 160, and/or other computers on the network, which may also include web interfaces, respectively.

The web interface 118 may also enable the SIC server 105 to provide services, such as certificate provisioning or acting as an authentication proxy, for example, to the controller 140 and/or the first and second instruments 150 and 160 at runtime, after the secure configuration is complete. This consolidates performance of these services by the SIC server 105, so that each of the controller 140 and the first and second instruments 150 and 160 do not need to perform them individually. Each of the networked devices (the controller 140, the first instrument 150 and/or the second instrument 160) may remain securely connected to the SIC server 105 to perform credential generation and validation, performed through a third party, which otherwise would be burdensome for each of them, individually.

For example, in a conventional set up, a supplicant device (e.g., controller or instrument) of the networked devices individually requests authorization from the third party to use an outside resource. In response to the requested authorization, the third party validates the supplicant device, either the instrument on behalf of the controller, or the controller on behalf of the instrument, and then the supplicant device, either the controller or the instrument, receives a software ticket from the third party. The supplicant device then provides the software ticket to the networked devices, either the controller or instrument, that it is accessing. The networked device being accessed, either the controller or instrument, then checks the validity of the software ticket with the third party.

In comparison, according to an embodiment, this validation through the third party is simplified by delegating the process of contacting the third party to the SIC server 105 to be performed on behalf of both the supplicant device (the controller 140, the first instrument 150 or the second instrument 160) and the networked device being accessed (the controller 140, the first instrument 150 or the second instrument 160). That is, the SIC server 105 provides services that may be accessed by the controller 140, the first instrument 150, and/or the second instrument 160 via an application programming interface (API) that permit them to either request a software ticket or validate a software ticket, depending on their role in the transaction. The API is provided by the third party authentication service, such as RADIUS™, OAuth or Windows Active Directory®, for example. When the SIC server 105 presents the software ticket to a networked device, the networked device checks back with the third party to verify the validity of the software ticket. Since the SIC server 105 may be updated and maintained much more easily than the controller 140, the first instrument 150 and the second instrument 160 (as well as additional controller and/or instruments which may be part of the networked system), individually, the longevity of these networked devices is improved, e.g., since new or modified protocols are implemented externally in a pure software environment. Also, implementation costs are reduced, e.g., since the implementation is done once for all of the networked devices from the SIC server 105.

In the depicted embodiment, the controller 140 includes a software agent 141 and an input output library suite (IOLS) 142. The software agent 141 may be an API, such as an HTTP REST API, a Websockets API or a remote procedure call (RPC) API, for example, that enables communication of controller secure configuration information, regarding secure connections between the controller 140 and each of the first and second instruments 150 and 160, from the controller secure configuration module 122 of the SIC server 105 to the controller 140. The IOLS 142 stores the controller secure configuration information for later use when the user wants to initiate a secure connection to the first instrument 150 and/or the second instrument 160 via the controller 140. The first instrument 150 and the second instrument 160 include software agents 151 and 161 and host processor platforms (HPPs) 152 and 162, respectively. The software agent 151 likewise may be an API, such as an HTTP REST API, a Websockets API or an RPC API, for example, that enables communication of first instrument secure configuration information, regarding secure connections specific to the first instrument 150 between the controller 140 and the first instrument 150, from the first instrument secure configuration module 123 to the first instrument 150. Likewise, the software agent 161 provides a simple interface that enables communication of second instrument secure configuration information, regarding secure connections specific to the second instrument 160 between the controller 140 and the second instrument 160, from the second instrument secure configuration module 124 to the second instrument 160. The HPPs 152 and 162 store the respective secure configuration information for later use when the controller starts a secure connection.

Figure 2:
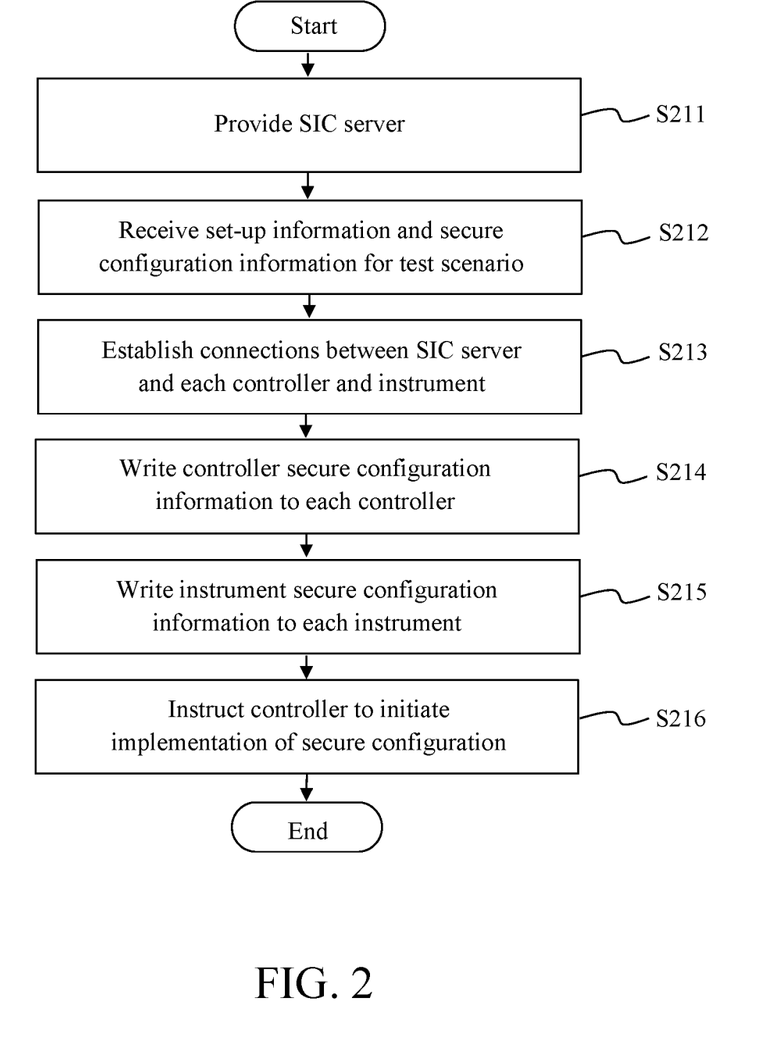
FIG. 2 is a flow diagram showing a method of implementing a secure configuration of at least one controller and at least one instrument in a networked system, according to a representative embodiment.

FIG. 2 is a flow diagram showing a method of implementing a secure configuration of at least one controller and at least one instrument in a networked system, according to a representative embodiment. The method may be implemented on the networked system 100, discussed above, for example.

Referring to FIG. 2, a SIC server is provided in block S211 to consolidate security configuration of networked devices for a particular test scenario, including the at least one controller (e.g., controller 140) and the at least one instrument (e.g., instrument 150, 160) in the networked system. The SIC server may be implemented on a standalone computer that stores and executes the SIC server software, as shown in FIG. 1, or on one of the at least one controller, the at least one instrument, or other centralized control device with processing capability. The SIC server may be provided, for example, by downloading the SIC server software from a provider over the internet, or uploading the SIC server software from a CD-ROM or DVD, to the control device.

In block S212, set-up information and secure configuration information are received by the SIC server, for example, through a user interface (e.g., user interface 112) or a web interface (e.g., web interface 118), regarding networked devices in one or more test scenarios, respectively. The set-up information is used to securely configure the networked devices over a communication network (e.g., communication network 130). The set-up information may include network address and security information, such as host names and IP addresses of the networked devices, and used to establish secure connections over network 130 to configure the networked devices. For example, the security information may include symmetrical credentials and credential authentication information (e.g., usernames and passwords) necessary to gain access to the configuration software agents on the controllers and/or instruments. In the illustrative embodiment depicted in FIG. 1, the set-up information enables access to the software agent on the controller 140 and the software agents on the first and second instruments 150 and 160. This permits the secure configurations that are subsequently used for communication between the controller 140 and each of the first and second instruments 150 and 160 to be placed on these networked devices using the communication network 130.

The secure configuration information includes controller secure configuration information and instrument secure configuration information for the networked devices in the test scenario to enable establishment of secure communications among them over a control network (e.g., control network 135). The controller secure configuration information for each controller includes controller credentials to be used by the instruments to identify the controller, and authentication data and authentication methods to be used by the controller to authenticate the instruments with which the controller is to communicate. The authentication data may include root authority certificates, for example. The instrument secure configuration information for each instrument includes instrument credentials to be used by the controller to identify the instruments and, authentication data and authentication methods to be used by the instrument to authenticate the controller, for example. In the illustrative embodiment depicted in FIG. 1, the configuration information may include authentication information for the controller 140, the first instrument 150, and the second instrument 160 to enable secure communications among them over the control network 135, where the authentication information includes both the credentials proffered by a networked device to identify itself, and the information used to authenticate the credentials.

As used here, a "credential" is information offered up by a network entity to identify itself that another network entity can validate to ensure that the entity offering the credential is the intended entity. A credential may be one or more certificates, for example. "Authentication data" is data that is necessary to perform an authentication using a given authentication method, and potentially specific to a particular credential. An "authentication method" is a particular technique that a network entity may use to validate a credential proffered by some other network entity. For example, an authentication method may be "fingerprinted certificate," in which case the credential is a certificate and the authentication data is a fingerprint that is used to validate it. Another authentication method may be "certificate by root authority," in which case the credential is a certificate and the authentication data is a root authority certificate that can be used to cryptographically validate the certificate. Yet another authentication method may be anonymous, in which case any network entity is accepted and no authentication data is required.

In an embodiment, the instrument secure configuration information may also include security configuration information, e.g., provided to the instruments themselves. For example, the security configuration information may include instrument settings that define security related settings of the instrument, such as which ports are turned on/off, and whether networking features such as Ping or mDNS are enabled. In this case, the instrument secure configuration information written to the instruments may be determined, in part, based on the security configuration information received from the instruments, respectively.

The set-up information and the configuration information for each test scenario may be named and stored as a named configuration for future use. Once the named configuration for the test scenario is stored, it may be accessed and implemented without having to repeat receiving the set-up information and the configuration information.

In block S213, initial connections are established over the communication network between the SIC server and each of the at least one controller and the at least one instrument in a particular test scenario. For purposes of explanation, it is assumed that the test scenario includes one controller and two instruments, as discussed above, although it is understood that the process applies to configuration of any number of controllers and instruments. For example, a test scenario for measuring gain and phase shift of a DUT may include as instruments a signal generator for providing a stimulus signal and a digital oscilloscope for measuring the stimulus signal input to the DUT and the response signal output by the DUT. These instruments may be controlled by a single test station as the controller. To establish the initial connections, the SIC server makes initial contact to respective software agents on the controller and the instruments using the network address information and the security information from the set-up information, e.g., provided in block S212.

As described above, the initial connection between the SIC server and the controller may be established by the SIC server using the host name and the IP address of the controller provided by the set-up information, for example. Alternatively, the initial connection between the SIC server and the controller may be established by the SIC server automatically discovering the controller when the SIC server is powered up or otherwise initiated. The SIC server may automatically discover the controller using dynamic discovery via multicast domain name system (mDNS), already supported by the controller, or other lookups such as Windows Active Directory® or DNS, for example. The initial connection between the SIC server and each of the instruments may be similarly established using the host name and the IP address of each of the instruments provided by the set-up information. Similarly, the initial connections between the SIC server and the instruments alternatively may be established by the SIC server automatically discovering the instruments using dynamic discovery via mDNS, for example, supported by the instruments. Irrespective of how the initial connections to the networked devices are performed, the secure configuration information provided by the set-up information described above may be (optionally) used to communicate with the network devices securely.

In an embodiment, the SIC server is also configured to collect port-based network access credentials for a port-based network from the user via the user interface. The port-based network may be a Wifi network or a wireless LAN, for example, requiring network access via an access port (e.g., ethernet cable receptacle). This is a function of managed networked switches that have the ability to authenticate and optionally authorize controllers and instruments that are attached to the access ports and to filter traffic to/from the access ports based on the authorizations configured for the instruments. The SIC server then writes the collected port-based network access credentials to the controller and each of the instruments to connect to the port-based network, when required. In this way, the controller and the instruments can receive the configuration information for the port-based network from the SIC server. Thus, the SIC server can be used to additionally provision the correct authentication information into the controller and instruments to allow them authenticated direct access to the port-based network.

A status may be provided to the user by the SIC server via the user interface. The status may identify the at least one controller and the at least one instrument to a user to be used in the particular test scenario. For example, when the user interface includes a GUI, the name of the test scenario and a visual depiction of the at least one controller and the at least one instrument involved may be displayed, along with the host names and IP addresses, enabling the user to verify the selection of the named configuration. The GUI may also display an operational status of the at least one controller and the at least one instrument, providing information such as whether the networked devices are powered on, in need of maintenance, or malfunctioning in some way. Status indicators may be used to show when the SIC server has pushed the current configuration to the at least one controller and/or the at least one instrument, and whether there are pending changes.

In block S214, the SIC server writes controller secure configuration information of the test scenario to the controller through a software agent on the controller. The SIC server may write the controller secure configuration information via an API, as discussed above. As described above with reference to block S212, the controller secure configuration information may include authentication information for each instrument in the configuration. The authentication information includes authentication data, such as one or more root authority certificates, and authentication methods used by the controller to authenticate the instrument when establishing the secure connection. For example, the controller may authenticate certificates that are presented to the controller by the instrument. The user provides the authentication information when adding or updating secure configuration information for a controller or instrument, as discussed above. Certificates may be placed on the instruments during manufacture, or certificates may be provided by the SIC server, for example. In an embodiment, the authentication data may include a certificate fingerprint of each instrument to be verified by the controller for authentication. A certificate fingerprint is a value that is a checksum or hash of the certificate, e.g., using the SHA256 algorithm, for each instrument that is likely to be different for any two instrument certificates. The controller secure configuration information may further include one or more credentials (e.g., certificates) of the controller that are presented to each instrument for authenticating the controller's identity to the instruments. These credentials may be provided by the user when adding and/or updating configurations, as discussed above.

In block S215, the SIC server writes instrument secure configuration information to each of the instruments through corresponding software agents on the instruments. As described above with reference to block S212, the instrument secure configuration information may include authentication data and authentication methods to be supported by the instrument to authenticate the controller. The instrument secure configuration information written to the instruments may also include the credentials used by the instrument to authenticate itself with the controller. For example, the authentication methods may include step-by-step processes implemented by the instrument to enable the secure configuration, and may be defined by the SASL RFC 4422 or GSS-API RFC 2743, for example, which are known to one skilled in the art. The credential information for each instrument corresponds to the authentication information included in the controller secure configuration information provided to the controller in block S214. Likewise, the credential information for the controller corresponds to the authentication information included in the instrument secure configuration information provided to the instruments in block S215. The controller establishes the secure connections with the instruments using the controller credentials, along with the instrument authentication information discussed above.

Accordingly, the secure configuration of the controller (e.g., credentials, authentication methods, and authentication data such as root authority certificates and certificate fingerprints) and the secure configuration of the instruments (e.g., credentials, authentication methods, and authentication data such as root authority certificates and certificate fingerprints) are managed and provided to the controller and the instruments from a single control point, thereby reducing time and effort, and otherwise avoiding confusion by the user when attempting to establish the secure connections by accessing and configuring the controller and instruments individually. By providing the user with a single application executable by the SIC server to implement the secure configuration, the credential and authentication information will be correctly sent to the appropriate networked devices. The single SIC server allows the user to enter the information one time at a centralized device for each desired secure configuration, regardless of the number of controllers and instruments involved, and store this information as a named configuration for future use. The user can validate all the connectivity from one place. Also, several sets of authentication information may be associated with a single networked device, where the networked device is to be used in different secure configurations for different purposes. For instance, the instruments may have long lists of names of authorized users (along with passwords) allowed to create secure connections to the instruments. The lists of authorized users may also be shared with other interfaces to the instrument, such as a web server. The SIC server may store encrypted the user names and passwords, and provide them to the controllers and instruments that share the respective configurations. Thus, the SIC server maintains a single source of the user names and passwords, so that the controllers and instruments are consistent with regard to this information. Providing the single SIC server simplifies the administration of configuring the various secure connections.

In block S216, the SIC server instructs the controller to initiate implementation of the secure configuration in accordance with the controller secure configuration information and the instrument secure configuration information written to the controller and the instruments. That is, the controller establishes a secure connection with each of the instruments using the controller secure configuration information and the instrument secure configuration information corresponding to the instruments, respectively. The secure connection between the controller and each of the instruments may be made according to any compatible connection protocol, such as the IVI Hi SLIP, or the TLS protocol, for example.

In an embodiment, the controller may establish the secure connections with the instruments using only the controller secure configuration information. In this case, the instrument secure configuration information may further include permissions for the instrument to accept anonymous connection requests. This enables the controller to connect with the instrument without having provided the controller credentials to the instrument.

In alternative embodiments, the secure connections between the controller and the instruments may be enabled by some secret credential, such as a large random number, for example. When the controller and the instruments are holding the same secret credential, then communication is secure and permitted. Use of secret credentials is a form of authentication, although such techniques are more bidirectional, where the secret credentials may be viewed as a credential and/or authentication information in the embodiments discussed above.

Notably, the process depicted in FIG. 2 shows a single flow, for ease of illustration. It is understood, however, that the process may be iterative. That is, the user may add controllers and instruments, as well as corresponding credentials and authentication methods/data, in any order at the SIC server until the user is ready to push a secure configuration form the SIC server to the controllers and instruments involved. The cycle shown in FIG. 2 can then repeat.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A method of implementing a secure configuration of a networked system for secure communications over a control network, the networked system including at least one instrument for performing corresponding tasks, and at least one controller for controlling functions of the at least one instrument, the method comprising:

providing a secure instrument configuration (SIC) server on a computer, wherein the SIC server is in communication with each of the at least one controller and the at least one instrument over a communication network different from the control network;

receiving identification of the at least one controller and the at least one instrument via a user interface with the SIC server;

writing controller secure configuration information from the SIC server to the at least one controller over the communication network using an interface on the at least one controller between the SIC server and the at least one controller, the controller secure configuration information comprising controller authentication data and at least one authentication method for the controller to authenticate the at least one instrument, and/or one or more credentials of the at least one controller acceptable by the at least one instrument for identifying the at least one controller;

writing instrument secure configuration information from the SIC server to the at least one instrument over the communication network using an interface on the at least one instrument between the SIC server and the at least one instrument, the instrument secure configuration information comprising instrument authentication data and at least one authentication method to be supported by the at least one instrument for the at least one instrument to authenticate the at least one controller;

communicating, by the SIC server, with the at least one controller to initiate implementation of the secure configuration, wherein the at least one controller establishes a secure connection with the at least one instrument over the control network using the controller secure configuration information and the instrument secure configuration information; and offering, by the SIC server and after the implementation of the secure configuration is complete, third party services to the at least one instrument and the at least one controller enabling the at least one instrument and the at least one controller to perform authentication by interrogating the SIC server at run-time, and wherein the SIC server checks site credentials for the third party services and informs the at least one instrument and the at least one controller whether to accept the third party services.

2. The method of claim 1, wherein the instrument secure configuration information further comprises one or more credentials of the at least one instrument acceptable by the at least one controller for identifying the at least one instrument.

3. The method of claim 1, wherein the controller authentication data comprises one or more root authority certificates.

4. The method of claim 3, wherein the one or more root authority certificates are presented to the at least one controller based on an Interchangeable Virtual Instrument Foundation, High-Speed LAN instrument protocol (IVI HiSLIP) or a transport layer security (TLS) protocol used to interface to the at least one instrument.

5. The method of claim 1, wherein the instrument authentication data comprises fingerprinting the at least one instrument to be verified by the at least one controller for authentication.

6. The method of claim 1, wherein the instrument secure configuration information further comprises permission for the at least one instrument to accept anonymous connection requests.

7. The method of claim 1, further comprising: initially receiving, at the SIC server, security configuration information from the at least one instrument, wherein the instrument secure configuration information written to the at least one instrument is determined, in part, based on the security configuration information.

8. The method of claim 1, further comprising: establishing an initial connection between the SIC server and the at least one controller using a host name and an IP address of the at least one controller; and establishing an initial connection between the SIC server and the at least one instrument using a host name and an IP address of the at least one instrument.

9. The method of claim 1, further comprising: establishing an initial connection between the SIC server and the at least one controller by automatically discovering the at least one controller.

10. The method of claim 1, wherein the SIC server is configured to collect port-based network access credentials for a port-based network from a user via the user interface, and to write the port-based network access credentials to the at least one instrument to be provided when subsequently required for the at least one instrument to connect to the port-based network.

11. The method of claim 1, further comprising: displaying status indicators to show when the SIC server has written the controller secure configuration information to the at least one controller and/or the instrument secure configuration information to the at least one instrument.

12. The method of claim 1, wherein the communication network comprises an ethernet network, a wireless local area network (LAN), or a wired LAN, and wherein the control network comprises an Interchangeable Virtual Instrument Foundation, High-Speed LAN instrument protocol (IVI HiSLIP), rev 2, network or a transport layer security (TLS) protocol network configured to transport standard commands for programmable instruments (SCPI) commands.

13. A system for implementing a secure configuration of a networked system for secure communications over a control network, the networked system including at least one instrument for performing corresponding tasks, and at least one controller for controlling functions of the at least one instrument, the system comprising:

a processor for implementing a secure instrument configuration (SIC) server;

a user interface configured to enable interaction between a user and the processor; and a memory for storing instructions that, when executed by the processor, cause the processor to:

receive identification of the at least one controller and the at least one instrument via the user interface, wherein the SIC server is in communication with each of the at least one controller and the at least one instrument over a communication network different from the control network;

write controller secure configuration information from the SIC server to the at least one controller over the communication network using an interface on the at least one controller between the SIC server and the at least one controller, the controller secure configuration information comprising controller authentication data and at least one authentication method for the at least one controller to authenticate the at least one instrument, and/or one or more credentials of the at least one controller acceptable by the at least one instrument for identifying the at least one controller;

write instrument secure configuration information from the SIC server to the at least one instrument over the communication network using an interface on the at least one instrument between the SIC server and the at least one instrument, the instrument secure configuration information comprising instrument authentication data and at least one authentication method to be supported by the at least one instrument for the at least one instrument to authenticate the at least one controller;

communicate with the at least one controller to initiate implementation of the secure configuration, wherein the at least one controller establishes a secure connection with the at least one instrument over the control network using the controller secure configuration information and the instrument secure configuration information; and offer, by the SIC server and after the implementation of the secure configuration is complete, third party services to the at least one instrument and the at least one controller enabling the at least one instrument and the at least one controller to perform authentication by interrogating the SIC server at run-time, and wherein the SIC server checks site credentials for the third party services and informs the at least one instrument and the at least one controller whether to accept the third party services.

14. The system of claim 13, wherein the user interface comprises a graphical user interface (GUI) or a user programmatic interface.

15. The system of claim 13, wherein the instrument authentication data comprises one or more certificates for the at least one instrument to be presented to the at least one controller for instrument authentication.

16. The system of claim 13, wherein the instrument authentication data comprises fingerprinting the at least one instrument to be verified by the at least one controller for authentication.

17. The system of claim 13, further comprising: a display configured to display status indicators to show when the controller secure configuration information has been written to the at least one controller and/or the instrument secure configuration information has been written to the at least one instrument.

18. The system of claim 13, wherein the SIC server comprises web interface enabling control of the SIC server from the at least one instrument, the at least one controller, and/or an independent computer on the web.

19. The system of claim 13, wherein the communication network comprises an ethernet network, a wireless local area network (LAN), or a wired LAN, and wherein the control network comprises an Interchangeable Virtual Instrument Foundation, High-Speed LAN instrument protocol (IVI HiSLIP), rev 2, network or a transport layer security (TLS) protocol network configured to transport standard commands for programmable instruments (SCPI) commands.

* * * * *